United States Patent Office 3,098,829
Patented July 23, 1963

3,098,829
SUPPORTED NICKEL CATALYSTS
Peter Thomas White and Robert William Aitken, Sunbury-on-Thames, England, assignors to The British Petroleum Company Limited, London, England, a British joint-stock corporation
No Drawing. Filed Apr. 19, 1961, Ser. No. 103,982
Claims priority, application Great Britain May 4, 1960
4 Claims. (Cl. 252—466)

This invention relates to improving the activity of metallic nickel catalysts supported on a carrier, which have been prepared from nickel formate.

It is known that nickel formate can be reduced directly to nickel according to the equation $$Ni(COOH)_2 = Ni + CO + CO_2 + H_2O$$

in a non-oxidising atmosphere e.g. on heating in a stream of hydrogen or an inert gas stream. It is also known that the reduction takes place at relatively low temperatures of the order of 150°–300° C. and since the use of higher temperatures than necessary is obviously economically undesirable, these low temperatures are normally preferred.

It has now been found that the use of higher temperatures is beneficial in improving catalyst activity, particularly under certain circumstances which will be explained in detail below.

According to the present invention, metallic nickel catalysts supported on a carrier are prepared by reducing supported nickel formate at a temperature above 300° C. but below that at which damage to the carrier may occur.

One reason why higher temperatures are beneficial may be due to the fact that two of the gaseous reaction products, carbon monoxide and water vapour react with metallic nickel to give respectively nickel carbonyl and nickel oxide, both of which are undesirable in metallic nickel catalysts and which would reduce the activity of the catalyst. The reactions are favoured by lower temperatures and hence higher temperatures reduce the risk of these undesirable reactions occurring.

The danger of these reactions occurring is accentuated when the quick removal of the reaction products from the neighbourhood of the nickel is hindered. This occurs, for example when the carrier is of relatively low permeability, particularly when the surface of the carrier is of low permeability. Carriers of a sufficiently low permeability to hinder the removal of reaction products could potentially be produced with any method of catalyst preparation but it is particularly likely with catalysts in which the carrier has been made by extrusion, that is by forcing a slurry of the carrier material, with or without added catalytic material, through a nozzle, cutting the extruded filament into pieces of suitable length and drying the extrudates thus formed. There are a large number of factors which may affect the physical characteristics of an extrudate, including its permeability. These factors include, for example, the size of the particles in the slurry, the amount of the slurrying liquid, which is usually water, the pressure at which the slurry is forced through the nozzle, the temperature and the rate of drying of the extrudate, the humidity during drying, and the length of time between the drying and the calcination of the extrudate.

The chemical and physical characteristics of the actual compound or compounds forming the carrier may also affect the permeability of the carrier, particularly when the carriers are formed by extrusion. It has been found that problems of catalyst activity occur particularly with extruded catalysts using sepiolite as the carrier. Sepiolite is a commercially available clay mineral which occurs naturally and which can also be prepared synthetically. It has the ideal formula $H_4Mg_9Si_{12}O_{30}(OH)_{10}$ and is also known as meerschaum. Catalysts comprising nickel or a nickel compound supported on a carrier consisting essentially of sepiolite are described and claimed in U.K. patent application No. 24027/58, corresponding to United States Patent 3,004,914, granted October 17, 1961. However, the process of the present invention may be suitable for catalysts with carriers of refractory oxides, for example alumina, other clay minerals and siliceous materials such as kieselguhr.

In cases where the carrier is of low surface permeability due to the formation of a surface skin during extrusion, as with, for example certain extruded nickel on sepiolite catalysts, the process of the present invention may be combined, if desired, with the process described in our copending British application No. 15727/60, which is concerned with improving catalyst activity by removing a small proportion of the catalyst exterior by attrition.

Preferably the catalyst contains from 1 to 50% of nickel (expressed as elemental nickel) by weight of total catalyst, and more particularly from 5 to 15% wt.

The temperature at which the nickel formate is reduced is preferably above 400° C. The upper limit of temperature is, as stated above, determined by the necessity of avoiding damage to the carrier, and may thus vary with different carriers. However, for most known carriers including the preferred sepiolite carrier and alumina, a temperature of 600° C. or below is desirable. It is also desirable to carry out the reduction in a stream of non-oxidising gas for example hydrogen or an inert gas and the space velocity may be from 10 to 1000 volumes of gas/volume of catalyst/hr. It is preferred to use a gas containing hydrogen, for example catalytic reformer tail gas or steam cracker tail and gas and the space velocity may in certain circumstances be limited by the availability of such a gas. The highest convenient space velocity is normally preferred because an increased rate of gas flow assists in quickly removing gaseous reaction products from the neighbourhood of the nickel. The pressure may be atmospheric to 50 p.s.i.g. and the time from 2 to 100 hours.

After the reduction, the nickel catalyst should not be allowed to come into contact with air or spontaneous oxidation of the nickel to nickel oxide may occur.

For the reasons outlined above it will be apparent that an accurate forecast of catalyst activity may be difficult and that different batches of catalyst although of identical appearance may have very different activities. The present process is therefore particularly suitable for improving the activity of catalysts which have a low or moderate activity when reduced below 300° C. The degree of activity required will depend on the catalyst and the process for which it is to be used and will normally be measured by a comparative test. For example, the catalyst may be tested for hydrogenation activity by passing over it, under standard conditions, an unsaturated feedstock and hydrogen and measuring the hydrogen absorbed. When processing a feedstock having a specific gravity at 60° F./60° F. within the range 0.70 to 0.80 under process conditions set out in Example 1 hereafter a criterion of satisfactory activity is a hydrogen consumption of at least 100 s.c.f./b. and preferably at least 150 s.c.f./b. A hydrogen consumption of less than 100 s.c.f./b. is a low activity. The catalysts may be used for hydrogenation reactions generally, but are particularly suitable for reducing the gum-forming tendency of gasolines produced by high temperature thermal cracking processes. These processes which use temperatures of 460° to 900° C. preferably 600 to 900° C. besides producing large quantities of unsaturated normally-gaseous hydrocarbons, may also produce gasoline fractions of high octane number but which tend to form gum possibly due to the presence of styrene, cyclopentadiene and other conjugated dienes. It is desirable to selectively hydrogenate these gum forming hydrocarbons without hydrogenating appreciable amounts of aromatics and mono-olefins, which contribute to the high octane number. The gasolines may also contain small amounts of sulphur, for example from 0.005 to 0.04% wt. but it has been found that in contradistinction to gasolines produces by catalytic cracking, the sulphur is present largely as thiophenes and not mercaptans and does not adversely affect the activity of the reduced nickel. A typical gasoline feedstock is steam cracker gasoline which is defined as a gasoline produced by cracking a petroleum distillate at 600° to 900° C. in the presence of steam.

The hydrogenation will be carried out in the presence of a hydrogen-containing gas. Suitable gas mixtures are mixtures of hydrogen with normally gaseous hydrocarbons, for example a platformer tail gas. Suitably a gas is employed containing 70 mol percent of hydrogen. A typical gas will consist of 70 mol percent of hydrogen and 30 mol percent of $C_1$ to $C_4$ paraffins. Other suitable gases are steam cracker tail gas, catalytic cracker tail gas and tail gas derived from dehydrogenation of hydrocarbons.

Preferably the severity of the conditions of hydrogenation is selected to provide a high percentage conversion of any di-olefins present to mono-olefins and to saturate the alkyl side chains of any styrenes present. As is well known in the art, severity of hydrogenation can be increased by raising the hydrogen partial pressure, raising the reaction temperature, increasing the hydrogen/feedstock ratio or decreasing the flow rate.

The hydrogen consumption per unit weight of feedstock is a measure of the degree of saturation of the di-olefins and styrenes, and hence the degree of improvement in the gum stability of the gasoline. Preferably the hydrogen consumption is at least 60 s.c.f./b., and more particularly at least 120 s.c.f./b., and it may be more than 150 s.c.f./b. The upper limit of hydrogen consumption will be determined by the undesirability of substantially reducing the octane number of the gasoline by hydrogenation of mono-olefins. In practice a hydrogen consumption of less than 250 s.c.f./b. should be suitable. Preferably the research octane number (with 1.5 ml. TEL/IG) of the gasoline product is not more than one octane number below the research octane number of the similarly leaded feedstock. Leaded research octane numbers are preferred as a basis for comparison since while there may be some slight drop in research octane numbers (clear) as between feed and product, this is offset by an increased lead response in the product.

A further reason for limiting the hydrogen consumption is that increased hydrogen consumption requires a higher operating temperature which will reduce the life of the catalyst.

Suitable hydrogenation conditions may be:

| | |
|---|---|
| Temperature | 0 to 200° C. (preferably 80 to 180° C.). |
| Pressure | 0 to 1000 p.s.i.g. (preferably 200–500 p.s.i.g.). |
| Gas recycle rate (recycle or once through) | 300 to 2000 s.c.f./b. of hydrogen. |
| Space velocity | 0.5 to 10 v./v./hr. (preferably about 2 v./v./hr.). |

The treated gasoline may be stabilised to give a product of low $C_4$ content and may also be re-run to remove a small proportion of heavy ends. Re-running at a maximum temperature of not more than 250° C., and preferably not more than 205° C. may be advisable, since high re-running temperatures can adversely affect gum stability.

Suitable tests which give a measure of the gum stability of gasolines during storage or in an engine are the Induction Period Test (ASTM Method D525–55), the Accelerated Gum Test (D873–49), and the Existent Gum (ASTM Method D381–57).

The invention is illustrated by the following examples.

*Example 1*

Sepiolite extrusions were made by forcing a sepiolite slurry through a nozzle, cutting the extrusion formed, and drying the pieces. These dried pieces were calcined at 550 C. and then impregnated with a nickel ammine formate solution containing about 11.5% wt. of nickel and dried at a temperature of 100° C. for 16 hours.

The nickel formate was reduced to nickel by passing a stream of hydrogen over the catalyst for 4 hours. The temperature was 250° C., the pressure atmospheric and the space velocity 100 volumes of hydrogen/vol. of catalyst/hr. The nickel content of the catalyst was 10% wt.

After reduction of the nickel formate to nickel the activity of the catalyst was measured by passing hydrogen along with a standardised steam cracker gasoline feedstock over a bed of catalyst. The unreacted hydrogen, which was separated from the steam cracker gasoline in a high pressure separator, was metered as it left the apparatus.

The amount of hydrogen taken up by the steam cracker gasoline under the conditions of test was the catalyst activity. The conditions of test are given below.

| | |
|---|---|
| Steam cracker gasoline feed rate ml./hr | 240 |
| Volume of catalyst ml | 120 |
| Hydrogen inlet rate, 1/hr. at STP | 32.5 |
| Reactor pressure p.s.i.g | 200 |
| Catalyst bed temperature ° C | 100 |
| Duration of test hours | 14 |

Inspection data on the feedstock were as follows:

| | |
|---|---|
| Specific gravity at 60° F./60° F. | 0.7135 |
| ASTM distillation: | |
| IBP ° C | 40 |
| 2% vol. recovered at ° C | 47 |
| 5% vol. recovered at ° C | 48.5 |
| 10% vol. recovered at ° C | 50 |
| 20% vol. recovered at ° C | 53.5 |
| 30% vol. recovered at ° C | 57 |
| 40% vol. recovered at ° C | 61 |
| 50% vol. recovered at ° C | 66 |
| 60% vol. recovered at ° C | 72.5 |
| 70% vol. recovered at ° C | 80 |
| 80% vol. recovered at ° C | 90 |
| 90% vol. recovered at ° C | 113.5 |
| FBP ° C | 153 |
| Recovery percent vol | 96 |
| Residue do | 2.7 |
| Loss do | 1.3 |
| Recovered at 70° C. do | 56.5 |
| Recovered at 100° C. do | 85.5 |
| Recovered at 140° C. do | 94 |
| Total sulphur percent wt | 0.003 |
| Diene index | 3.5 |
| Styrene correction | 1.7 |
| Bromine No. | 55.0 |
| Aromatics, ASTM percent vol | 15.5 |

The catalyst activity was 120 s.c.f./b. of hydrogen.

When, however, portions of the same sepiolite impregnated with nickel formate were reduced at 350° C. and 425° C. respectively the catalyst activities as measured by the same test were 169 s.c.f./b. and 270 s.c.f./b. respectively.

*Example 2*

Example 1 was repeated with a different batch of catalyst.

The catalyst activity when the nickel formate on sepiolite was reduced at 250° C. was 142 s.c.f./b., but when reduced at 425° C. it was 288 s.c.f./b.

Example 3

Portions of the catalyst of Example 1 were reduced at 250° C. and 425° C. respectively and then tested for activity using a test of longer duration to determine whether the activity was maintained over an extended period. The feedstock of Example 1 was used under the following conditions:

| | |
|---|---|
| Steam cracker gasoline feedrate ml./hr | 1000 |
| Volume of catalyst ml | 500 |
| Recycle gas rate s.c.f./b | 500 |
| Reactor pressure p.s.i.g | 350 |
| Hydrogen absorption s.c.f./b | 140 |

During these runs the catalyst bed temperature was increased to maintain the hydrogen absorption at the desired value. An assessment of the catalyst activity was obtained by comparing the time which elapsed before the catalyst temperature was increased to 150° C.

When the catalyst was reduced at 250° C. the catalyst temperature was raised to 150° C. at 170 hours on stream. When the catalyst was reduced at 425° C. the gasoline hydrogenation run was continued for 1500 hours before the catalyst temperature was raised to 150° C.

We claim:

1. A method of preparing catalysts of metallic nickel supported on a carrier which includes the steps of forming a catalyst composition of nickel formate on a carrier, said composition containing from 1–50% of nickel expressed as elemental nickel by weight of total catalyst, and thereafter, reducing the nickel formate to elemental nickel, the improvement comprising forming said catalyst composition by extrusion and reducing the said nickel formate to elemental nickel at a temperature from above about 400° C. to about 600° C. whereby the catalyst activity of said extruded catalyst is increased.

2. A method as claimed in claim 1 wherein the reduction is carried out in a stream of gas having a space velocity of from 10 to 1000 volumes of gas/volume of catalyst/hour.

3. The method as claimed in claim 1 wherein the carrier is sepiolite.

4. A method as claimed in claim 1 wherein the catalyst contains from 5 to 15% of nickel (expressed as elemental nickel) by weight of total catalyst.

References Cited in the file of this patent

UNITED STATES PATENTS

| 2,849,372 | Hanson | Aug. 26, 1958 |
| 3,004,914 | White | Oct. 17, 1961 |